Sept. 20, 1932.  R. D. PIKE  1,878,426
PROCESS FOR MANUFACTURE OF MONO POTASSIUM PHOSPHATE
Filed July 5, 1928
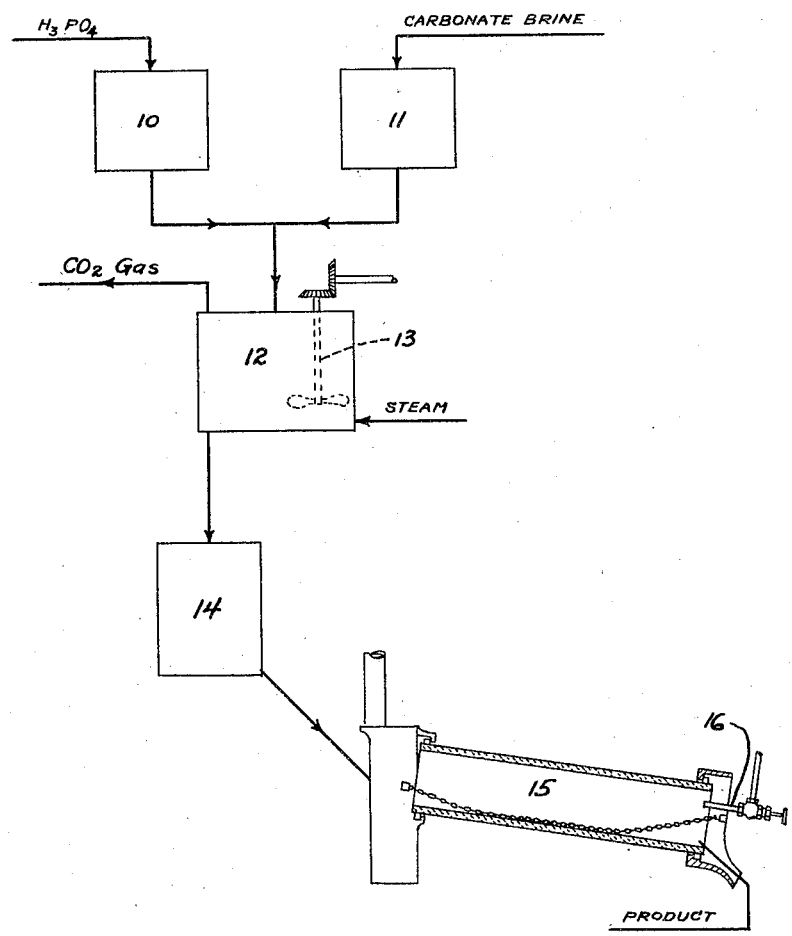
INVENTOR.
Robert D. Pike.
BY
Townsend, Loftus & Abbott
ATTORNEYS.

Patented Sept. 20, 1932

1,878,426

UNITED STATES PATENT OFFICE

ROBERT D. PIKE, OF PIEDMONT, CALIFORNIA

PROCESS FOR MANUFACTURE OF MONO-POTASSIUM PHOSPHATE

Application filed July 5, 1928. Serial No. 290,472.

My present invention relates to a process for the direct production of crude monopotassium phosphate from a solution containing the same.

An object of my invention is to provide a process whereby the above product may be produced by running the entire solution to dryness without resort to the step of crystallization during the production thereof.

In general, I produce the monopotassium phosphate bearing solutions by mixing potash bearing solutions, which are more alkaline than the desired product, with crude phosphoric acid, or with a product containing both potash and phosphoric acid, which product is more acidic than the desired product. Invariably, as a result of the mixture of such basic and acidic solutions to produce a solution which is mostly monopotassium phosphate, there forms a precipitate of iron and aluminum phosphates. It is, therefore, a further object of my invention to provide a means for producing a crude monopotassium phosphate by running the entire solution to dryness without filtration so that the product will contain all of the iron and aluminum occuring as impurities in the original material as phosphates of iron and aluminum, which impurities are valuable and available plant foods and therefore lend additional value to the product.

As examples of the basic and acidic materials which may be utilized in accordance with my process for the production of crude monopatassium phosphate, may be cited the following:

| Basic: | Acidic: |
|---|---|
| a. Brine composed largely of potassium carbonate in solution. | a. Crude phosphoric acid. |
| b. A solution composed largely of tripotassium phosphate. | b. A mixture of crude phosphoric acid with monopotassium phosphate which has been prepared by subjecting muriate of potash in a furnace to the action of a surplus of phosphoric acid. |

In order that a clearer understanding of my invention may be had I have prepared a flow sheet which accompanies this application and in order to more fully describe my invention I shall refer thereto and shall use as my ingredients the basic and acidic materials first above listed identified by the letter $a$ in each case. The steps are essentially the same if other combinations suggested by the above list be employed and, obviously, similar or analogous materials not specifically mentioned may be utilized. It should be noted that the acidic material identified by the letter $b$ is anhydrous and, if it be employed, sufficient water must be added to give a workable solution in the neutralization tank.

In the drawing 10 designates a storage tank for holding the phosphoric acid. This tank is carefully calibrated and is provided with an accurate gauge. The phosphoric acid used is preferably that made by treating phosphate rock with sulphuric acid, and it should be concentrated by well known means to contain 40% to 45% $P_2O_5$. This concentration removes most of the fluorine from the acid and this step is very important because otherwise relatively insoluble potassium fluosilicate would be present in the product. A tank 11 is provided into which I place the potassium carbonate brine. This tank 11, like the tank 10, is also carefully calibrated and provided with an accurate and suitable gauge.

In carrying out my process, the vital step is in the proper proportioning of the phosphoric acid and carbonate brine in a mixing tank 12. This latter tank is provided with a suitable agitating means in the form of a stirrer 13 so that the contents thereof will be continuously agitated. In order to accomplish the above proportioning aspect of my invention in a satisfactory and practical manner, I withdraw into a burette a small measured sample of acid from the tank 10 and titrate it with carbonate brine from the tank 11. The titrated mixture is filtered and its pH determined. By trial I find the exact proportions of the contents of the tank 10 and tank 11 to give a mixture with pH between 4.4 and 6.0, preferably nearer to the latter than to the former figure, because the more alkaline products show a lesser tendency to stick in the dryer. In a solution of pH= 4.4, 98% of the $P_2O_5$ is as the monoalkali phosphate and 2% is as the dialkali phosphate. In a solution of pH=6, 88% of the $P_2O_5$ is as the monoalkali phosphate and 12% is as the dialkali phosphate. Solutions which are either substantially more acidic or substantially more basic than this give, when run to dryness, sticky and hygroscopic products which are valueless. I have been unable to determine the precise limits of the satisfactory pH range, nor is this necessary for practical working, but I have found that on the acidic side a solution of ph=3.4, and on the basic side a solution of pH=6.4, give unsatisfactory products.

Having determined the exact proportions of the respective contents of tanks 10 and 11 to mix, these amounts are carefully measured and discharged into tank 12 where they are agitated by the stirrer 13 and preferably gently heated. Steam is introduced, as shown, for this purpose. $CO_2$ gas forms a valuable by-product. The neutralized solution goes to a storage tank 14, from whence it passes directly to a rotary kiln 15. The latter is heated by a suitable burner 16 and a tumbling chain is provided to prevent accumulations on the wall. The temperature of drying is kept around 200° C. because monopotassium phosphate decomposes into potassium metaphosphate at about 254° C. The product is dry, stable and non-hygroscopic and ideal for fertilizer application. It is highly concentrated, usually containing from 78% to 84% total available plant food. Any suitable means for drying other than a rotary kiln may be employed if desired.

While I have described a preferred embodiment of my invention as now known to me, it is to be understood that various changes may be made therein without departing from the spirit of the invention as defined in the appended claims.

Having thus described my invention, what I claim and desire to secure by Letters Patent is—

1. The process for producing crude monoalkali phosphate which consists in mixing a solution of impure phosphoric acid made by treatment of phosphate rock containing iron and aluminum with acid more acidic than pH=3.4 with a solution of an alkali more basic than pH=6.4 to give a solution containing principally monopotassium phosphate whose pH lies between 3.4 and 6.4, and running this solution to dryness for the production of a chemically stable, non-hygroscopic product.

2. The process for producing crude monopotassium phosphate which consists in mixing a solution containing principally potassium carbonate with a solution containing phosphoric acid made by treatment of phosphate rock containing iron and aluminum with acid and being more acidic than a solution of monoalkali phosphate, to give a solution whose pH lies between 3.4 and 6.4, and running this solution to dryness for the production of a chemically stable, non-hygroscopic product.

3. The process for producing crude monopotassium phosphate which consists in mixing potassium carbonate brine with phosphoric acid to give a solution with acidity between pH equals 3.4 and pH equals 6.4 and running the solution to dryness for the production of a chemically stable non-hygroscopic salt.

4. The process for producing crude monopotassium phosphate which consists in mixing potassium carbonate brine with phosphoric acid to give a solution with acidity between pH equals 6.4 and pH equals 3.4 and running the resulting solution to dryness at a temperature below 250° C. for the production of a chemically stable non-hygroscopic salt.

5. The process for producing crude monopotassium phosphate, which consists in mixing potassium carbonate brine with phosphoric acid, made by treatment of phosphate materials containing iron and aluminum with acid, in such an amount as to produce a solution having a hydrogen ion concentration between 10-3.4 and 10-6.4, and evaporating the solution to dryness, whereby a stable non-hygroscopic product is obtained.

6. The process for producing monopotassium phosphate, which consists in mixing potassium carbonate brine with phosphoric acid made by treatment of phosphatic material containing iron and aluminum with acid, in such an amount as to produce a solution having a hydrogen ion concentration between 10-3.4 and 10-6.4, and evaporating the resulting solution to dryness at a temperature below 250 degrees C., whereby a stable non-hygroscopic product is obtained.

7. The process for producing crude monopotassium phosphate which consists in mixing a solution containing principally tripotassium phosphate with a solution containing phosphoric acid more acidic than a solution of monoalkali phosphate, to give a solution whose pH lies between 3.4 and 6.4, and running this solution to dryness for the production of a chemically stable non-hygroscopic product.

ROBERT D. PIKE.